United States Patent
Maurya et al.

(10) Patent No.: US 10,503,478 B2
(45) Date of Patent: Dec. 10, 2019

(54) SYSTEM AND METHOD FOR GUIDING A USER IN A SOFTWARE DEVELOPMENT LIFECYCLE USING MACHINE LEARNING

(71) Applicant: HCL Technologies Limited, Noida (IN)

(72) Inventors: Arvind Kumar Maurya, Noida (IN); Yogesh Gupta, Noida (IN)

(73) Assignee: HCL Technologies Limited, Noida, Utta Pradesh ( * ) Notice: Subject to any disclaimer, the term of this patent is extended or adjusted under 35 U.S.C. 154(b) by 10 days.

(21) Appl. No.: 15/894,807

(22) Filed: Feb. 12, 2018

(65) Prior Publication Data

US 2018/0232211 A1    Aug. 16, 2018

(30) Foreign Application Priority Data

Feb. 14, 2017   (IN) .............................. 201711005248

(51) Int. Cl.
| | |
|---|---|
| *G06N 20/00* | (2019.01) |
| *G06F 8/33* | (2018.01) |
| *G06F 8/36* | (2018.01) |
| *G06F 8/10* | (2018.01) |
| *G06F 8/20* | (2018.01) |

(Continued)

(52) U.S. Cl.
CPC .................. *G06F 8/10* (2013.01); *G06F 8/20* (2013.01); *G06F 8/33* (2013.01); *G06F 9/453* (2018.02); *G06N 20/00* (2019.01); *G06F 8/36* (2013.01); *G06F 9/4451* (2013.01)

(58) Field of Classification Search
None
See application file for complete search history.

(56) References Cited

U.S. PATENT DOCUMENTS

| | | | |
|---|---|---|---|
| 8,245,186 B2 | 8/2012 | Gryko et al. | |
| 8,321,836 B2 * | 11/2012 | Meijer | .................... G06F 8/437 717/113 |

(Continued)

OTHER PUBLICATIONS

Sharma, Meera, et al. "Predicting the priority of a reported bug using machine learning techniques and cross project validation." 2012 12th International Conference on Intelligent Systems Design and Applications (ISDA). IEEE, 2012. (Year: 2012).*

(Continued)

*Primary Examiner* — Matthew J Brophy
(74) *Attorney, Agent, or Firm* — HM Law Group LLP; Vanintheran Moodley, Esq.

(57) ABSTRACT

The present disclosure relates to system(s) and method(s) for guiding a user in software development lifecycle using machine learning. The system is configured to receive real-time contextual information from a user device and user profile data from a profile database. Further, the system is configured to determine a current issue faced by the current user of the user device. In the next step, the system is configured to enforce a historical solution, from the set of historical solutions, associated with the current issue. If the historical solution is not applicable to address the current issue, the system is configured to extract one or more new solutions, from one or more secondary data sources. Finally, the system is configured to suggest the one or more new solutions to the current user, thereby guiding the current user to address the current issue.

15 Claims, 5 Drawing Sheets

(51) Int. Cl.
*G06F 9/451* (2018.01)
*G06F 9/445* (2018.01)

(56) References Cited

U.S. PATENT DOCUMENTS

| | | | |
|---|---|---|---|
| 8,468,391 B2 | 6/2013 | Balani et al. | |
| 8,656,343 B2* | 2/2014 | Fox | G06F 8/65 717/101 |
| 9,207,931 B2* | 12/2015 | Fox | G06F 8/65 |
| 9,519,477 B2* | 12/2016 | Champlin-Scharff | G06F 9/454 |
| 9,665,467 B2* | 5/2017 | Angwin | G06F 11/3668 |
| 9,740,462 B2* | 8/2017 | Rao | G06F 8/33 |
| 9,898,387 B2* | 2/2018 | Rodmell | G06F 11/3664 |
| 9,928,160 B2* | 3/2018 | Champlin-Scharff | G06F 9/454 |
| 2008/0320444 A1* | 12/2008 | Meijer | G06F 8/33 717/110 |
| 2009/0030902 A1* | 1/2009 | Aharoni | G06F 8/33 |
| 2011/0276354 A1* | 11/2011 | Bijani | G06Q 10/00 705/7.11 |
| 2013/0007700 A1* | 1/2013 | Villar | G06F 8/33 717/109 |
| 2013/0212562 A1* | 8/2013 | Fox | G06F 8/65 717/120 |
| 2014/0115562 A1* | 4/2014 | Fox | G06F 8/65 717/120 |
| 2014/0122697 A1 | 5/2014 | Liu et al. | |
| 2014/0282400 A1* | 9/2014 | Moorthi | G06F 8/71 717/122 |
| 2015/0082277 A1* | 3/2015 | Champlin-Scharff | G06F 9/454 717/120 |
| 2015/0269060 A1* | 9/2015 | Rodmell | G06F 11/3664 717/124 |
| 2016/0170742 A1* | 6/2016 | Pallath | G06F 8/70 717/120 |
| 2017/0004065 A1* | 1/2017 | Angwin | G06F 11/3668 |
| 2017/0083428 A1* | 3/2017 | Champlin-Scharff | G06F 9/454 |
| 2017/0109136 A1* | 4/2017 | Colle | G06F 8/20 |
| 2017/0206064 A1* | 7/2017 | Breazeal | H04N 13/239 |
| 2017/0213132 A1* | 7/2017 | Hammond | G06F 8/31 |
| 2017/0213154 A1* | 7/2017 | Hammond | G06F 8/31 |
| 2017/0330205 A1* | 11/2017 | Belanger | G06Q 30/0201 |
| 2018/0052898 A1* | 2/2018 | Allan | G06F 3/0482 |
| 2018/0067732 A1* | 3/2018 | Seetharaman | G06F 3/0482 |
| 2018/0068271 A1* | 3/2018 | Abebe | G06Q 10/103 |
| 2018/0089572 A1* | 3/2018 | Aili | G06N 5/022 |
| 2018/0101465 A1* | 4/2018 | Keinan | G06F 11/3624 |
| 2018/0107583 A1* | 4/2018 | Champlin-Scharff | G06F 9/454 |
| 2018/0129482 A1* | 5/2018 | Colle | G06F 8/20 |

OTHER PUBLICATIONS

Ceylan, Evren, F. Onur Kutlubay, and Ayse B. Bener. "Software defect identification using machine learning techniques." 32nd EUROMICRO Conference on Software Engineering and Advanced Applications (EUROMICRO'06). IEEE, 2006. (Year: 2006).*

* cited by examiner

FIGURE 5

SYSTEM AND METHOD FOR GUIDING A USER IN A SOFTWARE DEVELOPMENT LIFECYCLE USING MACHINE LEARNING

CROSS-REFERENCE TO RELATED APPLICATIONS AND PRIORITY

This present application claims benefit from Indian Complete Patent Application No: 201711005248 filed on 14 Feb. 2017 the entirety of which is hereby incorporated by reference.

TECHNICAL FIELD

The present disclosure in general relates to the field of software development and testing. More particularly, the present invention relates to a system and method for guiding a user in a software development lifecycle using machine learning.

BACKGROUND

In an organization, developers may face many challenges like old methods of learning and knowledge management used in software product development, new member without background knowledge of a product joining the software product development team, failure to cope up with fast changing technology, and the like. The situation may turn even worst if an old member, who has strong knowledge of the software product under development, leaves the product development team.

Furthermore, if a user (tester or developer) is working on a particular project using Machine-A, then all the personalized learnings, associated with the activities of the user, corresponding to the particular project are stored on Machine-A. In the course of time, if the user starts working on the same project using a different machine, all the personalized learnings, associated with the activities of the user, corresponding to the particular project on the Machine-A are lost. In this case, the user may have to work from scratch and may face same challenges, that are previously addressed by the user on Machine-A.

Furthermore, if a new user joints a product development team, the new member may not have enough knowledge of the software product. While developing the software product, the new member may face same issues that are already faced and addressed by rest of the team members and spend a considerable amount of time in addressing the same issues due to lack of efficient knowledge sharing mechanism in place.

SUMMARY

This summary is provided to introduce aspects related to a system and method for guiding a user of an Integrated Development Environment (IDE) and the aspects are further described below in the detailed description. This summary is not intended to identify essential features of the claimed subject matter nor is it intended for use in determining or limiting the scope of the claimed subject matter.

In one embodiment, a system for guiding a user of an Integrated Development Environment (IDE) is illustrated. The system comprises a memory and a processor coupled to the memory, wherein the processor is configured to execute programmed instructions stored in the memory. In one embodiment, the processor may execute programmed instructions stored in the memory for receiving real-time contextual information from a user device and user profile data from a profile database. The real-time contextual information may be associated with the Integrated Development Environment (IDE) enabled over the user device. The real-time contextual information may further comprise additional information corresponding to software application running on the user device. In one embodiment, the real-time contextual information may be captured by a local data processing unit enabled over the user device using text mining and machine learning algorithms. The user profile data may be associated with a current user of the user device. In one embodiment, the user profile data may comprise a set of historical solutions associated with the current user. The user profile data may also comprise background information of the current user. The current user may be a software developer or a software tester. Further, the processor may execute programmed instructions stored in the memory for determining at least one current issue faced by the current user, of the user device, based on the real-time contextual information. In the next step, the processor may execute the programmed instructions stored in the memory for enforcing a historical solution, from the set of historical solutions, when the historical solution is associated with the current issue. Furthermore, when the set of historical solutions is not applicable for addressing the current issue, the processor may execute programmed instructions stored in the memory for extracting one or more new solutions, associated with the current issue, from one or more secondary data sources. Finally, the processor may execute the programmed instructions stored in the memory for suggesting one or more new solutions to the current user, thereby guiding the current user of the Integrated Development Environment (IDE) to address the current issue.

In one embodiment, a method for guiding a user of an Integrated Development Environment (IDE) is illustrated. The method may comprise receiving, by the processor, real-time contextual information from a user device and user profile data from a profile database. The real-time contextual information may be associated with the Integrated Development Environment (IDE) enabled over the user device. The real-time contextual information may further comprise additional information corresponding to software application running on the user device. In one embodiment, the real-time contextual information may be captured by a local data processing unit enabled over the user device using text mining and machine learning algorithms. The user profile data may be associated with a current user of the user device. In one embodiment, the user profile data may comprise a set of historical solutions associated with the current user. The user profile data may also comprise background information of the current user. The current user may be a software developer or a software tester. Further, the method may comprise determining, by the processor, at least one current issue faced by the current user, of the user device, based on the real-time contextual information. Furthermore, the method may comprise enforcing, by the processor, a historical solution, from the set of historical solutions, when the historical solution is associated with the current issue. Furthermore, when the set of historical solutions is not applicable for addressing the current issue, the method may comprise extracting, by the processor, one or more new solutions, associated with the current issue, from one or more secondary data sources. Finally, the method may comprise suggesting, by the processor, one or more new solutions to the current user, thereby guiding the current user of the Integrated Development Environment (IDE) to address the current issue.

In one embodiment, a computer program product having embodied computer program for guiding a user of an Integrated Development Environment (IDE) is disclosed. The program may comprise a program code for receiving real-time contextual information from a user device and user profile data from a profile database. The real-time contextual information may be associated with the Integrated Development Environment (IDE) enabled over the user device. The real-time contextual information may further comprise additional information corresponding to software application running on the user device. In one embodiment, the real-time contextual information may be captured by a local data processing unit enabled over the user device using text mining and machine learning algorithms. The user profile data may be associated with a current user of the user device. In one embodiment, the user profile data may comprise a set of historical solutions associated with the current user. The user profile data may also comprise background information of the current user. The current user may be a software developer or a software tester. Further, program may comprise the program code for determining at least one current issue faced by the current user, of the user device, based on the real-time contextual information. Furthermore, the program may comprise a program code for enforcing a historical solution, from the set of historical solutions, when the historical solution is associated with the current issue. Furthermore, when the set of historical solutions is not applicable for addressing the current issue, the program may comprise the program code for extracting one or more new solutions, associated with the current issue, from one or more secondary data sources. Finally, the program may comprise a program code for suggesting one or more new solutions to the current user, thereby guiding the current user of the Integrated Development Environment (IDE) to address the current issue.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

The present subject matter relates to a system for guiding a user of an Integrated Development Environment (IDE). It must be noted that Integrated Development Environment (IDE) is considered as an example of a software development and testing platform. In another embodiment, the system may be configured for guiding a user (developer or tester) in any software development or testing activity performed over different software development and testing tools. The system is configured to receive real-time contextual information from a user device and user profile data from a profile database. In one embodiment, the real-time contextual information may be associated with the Integrated Development Environment (IDE) enabled over the user device and the user profile data may comprise a set of historical solutions associated with the current user. The real-time contextual information may further comprise additional information corresponding to software application running on the user device. The user profile data may also comprise background information of the current user. Further, the system is configured to determine a current issue faced by the current user of the user device. In the next step, the system is configured to enforce a historical solution, from the set of historical solutions, associated with the current issue, when the historical solution is applicable to address the current issue. If the historical solution is not applicable to address the current issue, the system is configured to extract one or more new solutions, from one or more secondary data sources. Finally, the system is configured to suggest the one or more new solutions to the current user, thereby guiding the current user to address the current issue.

While aspects of described system and method for guiding a user of an Integrated Development Environment (IDE) may be implemented in any number of different computing systems, environments, and/or configurations, the embodiments are described in the context of the following exemplary system.

Figure 1:
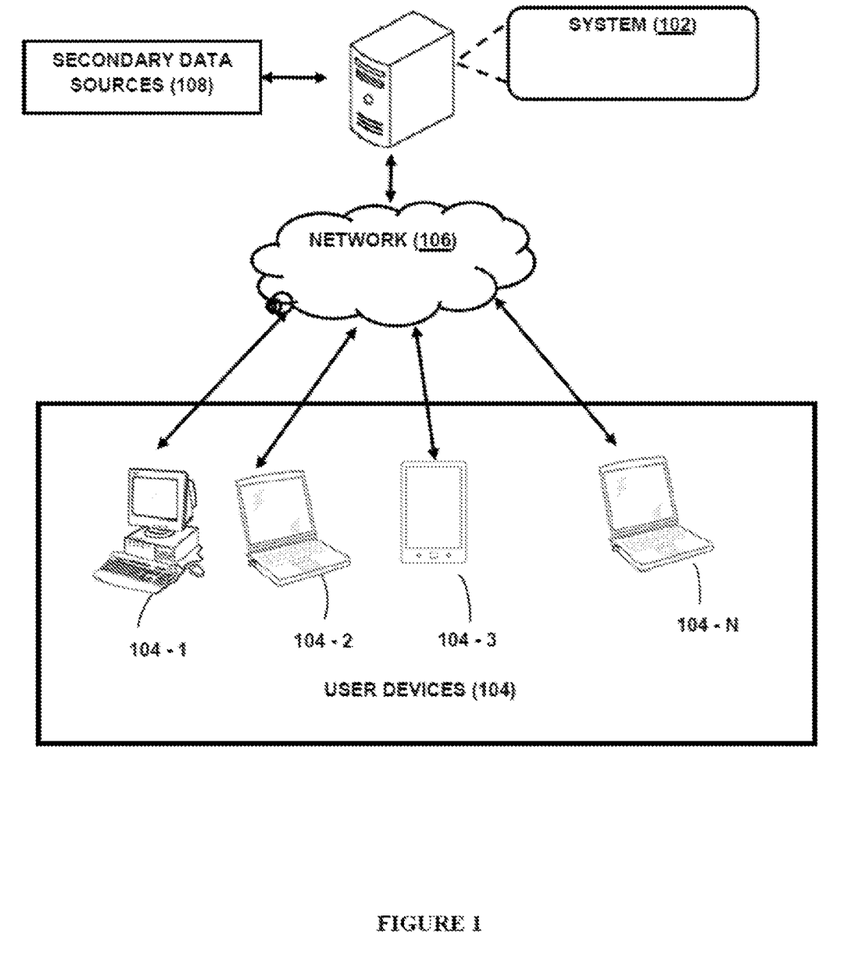
FIG. 1 illustrates a network implementation of a system for guiding a user of an Integrated Development Environment (IDE), in accordance with an embodiment of the present subject matter.

Referring now to FIG. 1, a network implementation 100 of a system 102 for guiding a user of an Integrated Development Environment (IDE) is disclosed. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented in a cloud-based environment. It will be understood that the system 102 may be accessed by multiple users (software developers, software testers) through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like. The system may further be connected to secondary data sources 108. In one embodiment, the user devices 104 may be enabled with a local data processing unit. The local data processing unit may be configured to capture real-time contextual information from the user device 104. The system 102 may be enabled with a global data processing unit. The global data processing unit is further configured to receive the real-time contextual information from the local data processing unit and determine at least one issue faced by the current user. The system 102 for guiding the user of the Integrated Development Environment (IDE) to address the at least one issue is further elaborated with respect to the FIG. 2.

Figure 2:
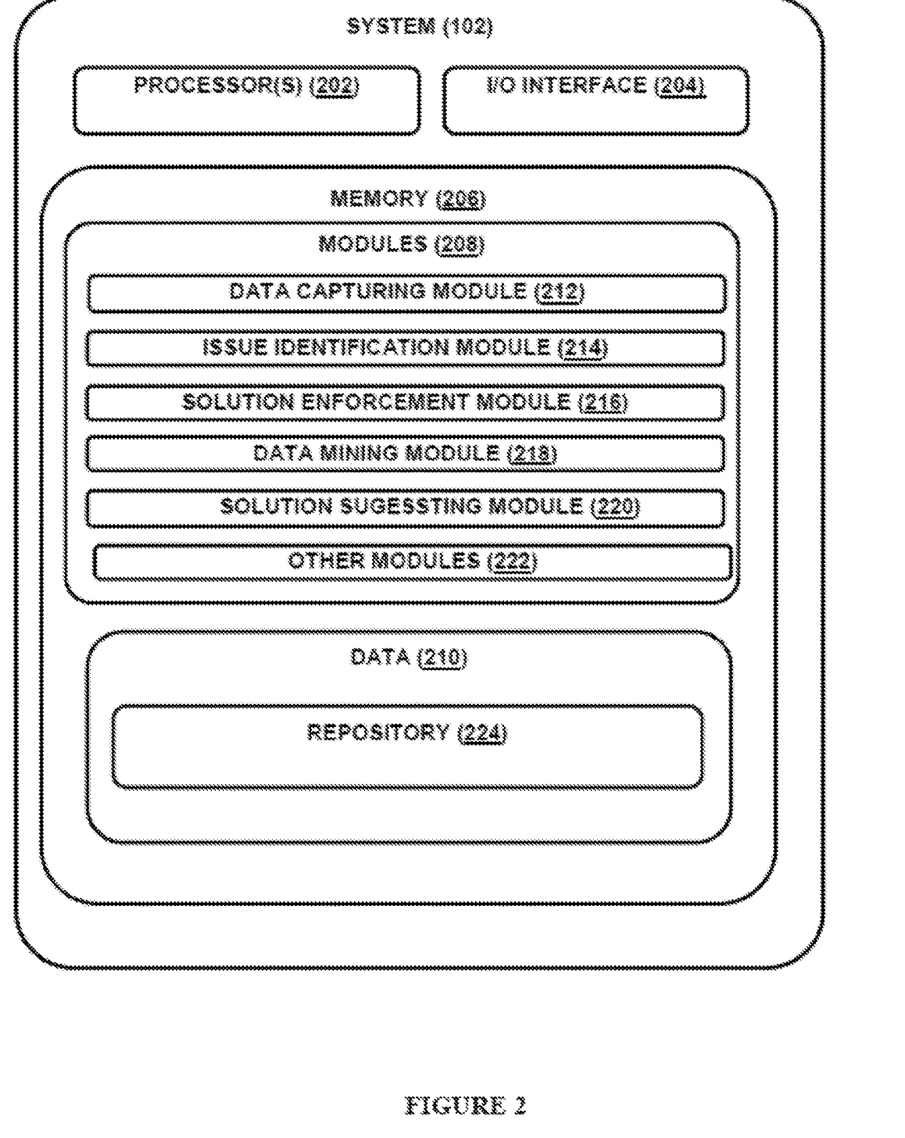
FIG. 2 illustrates the system for guiding the user of the Integrated Development Environment (IDE), in accordance with an embodiment of the present subject matter.

Referring now to FIG. 2, the system 102 for guiding a user of an Integrated Development Environment (IDE) is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the user devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 may be enabled over a global data processing unit. The modules 208 may include routines, programs, objects, components, data structures, etc., which perform particular tasks, functions or implement particular abstract data types. In one implementation, the modules 208 may include a data capturing module 212, an issue identification module 214, a solution enforcement module 216, a data mining module 218, a solution suggesting module 220 and other modules 222. The other modules 222 may include programs or coded instructions that supplement applications and functions of the system 102.

The data 210, amongst other things, serves as a repository for storing data processed, received, and generated by one or more of the modules 208. The data 210 may also include a repository 224.

In one embodiment, the repository 224 may be configured to maintain a profile database. The profile database may comprise user profile data associate with users of the Integrated Development Environment (IDE). The user profile data may comprise a set of historical solutions suggested to the user of the Integrated Development Environment (IDE). The set of historical solutions associated with the user may also correspond to historical leaning of the user regarding issues faced by the user in the past and solutions accepted or rejected by the user. The user profile data may also comprise background information such as professional experience, technical expertise, and other user specific data of the current user.

In one embodiment, the data capturing module 212 is configured to receive a real-time contextual information from a user device 104 of a current user. In one embodiment, the real-time contextual information may be captured by a local data processing unit enabled over the user device 104. The real-time contextual information may be associated with an Integrated Development Environment (IDE) enabled over the user device 104. The Integrated Development Environment (IDE) may be used by the current user for development or testing of a software product. The real-time contextual information may further comprise additional information corresponding to software application running on the user device. In one embodiment, the real-time contextual information may be determined, by the local data processing unit, based on at least one of a software development language, type of Integrated Development Environment (IDE), software defects and user profile data. The real-time contextual information may also include information regarding processes running on the user device and keystrokes of the current user. In one embodiment, the real-time contextual information may be captured at the user device using text mining and machine learning algorithms enabled by the local data processing unit.

Furthermore, the data capturing module 212 may receive a user profile data associated with the current user, from a profile database maintained in the repository 224. The user profile data may comprise a set of historical solutions associated with the current user of the user device 104. In one embodiment, the current user of the user device 104 may be a software developer or a software tester. Furthermore, the set of historical solution may comprise historical learning of the current user based on a set of historical issues faced by the current user in the Integrated Development Environment (IDE), comments received by the current user, and the like. In one embodiment, the user profile data may be replicated across different user devices 104 connected to the system 102.

Further, the issue identification module 214 is configured to determine at least one current issue, faced by the current user, based on the real-time contextual information. In one embodiment, the current issue may be software bug, code error, syntax error and the like. The issue identification module 214 may be configured to capture the current issue faced by the current user based on a pop-up error message displayed on the user interface of the user device 104. In another embodiment, the issue identification module 214 may be configured to analyse error log data, generated by the IDE, for determining the current issues faced by the current user.

In one embodiment, the current user may face multiple issues at a particular point of time, in the Integrated Development Environment (IDE), through the software product development lifecycle. In this case, the issue identification module 214 is configured to scan and prioritize each issue among the multiple issues faced by the current user. The issue identification module 214 is configured to assign a weighted score to each issue. Further, the issue identification module 214 is configured to sequentially address the issues based on the weighted score.

Once the current issue is identified, in the next step, the solution enforcement module 216 is configured determine if a solution for the current issue is already present in a set of historical solutions. The presence of the solution for the current issue in the set of historical solutions indicate that the current user has already faced the a similar or same issue in the past and has not accepted/adopted to the solution provided to him in the past. If the solution is already present in the set of historical solutions, the enforcing historical solution module 216 is configured to enforce the historical solution from the set of historical solutions applicable to the current issue without the consent of the current user. In one embodiment, instead of enforcing the solution, a warning message may also be given to the current user in order to follow/get used to the solutions already suggested to the current user. The enforcing historical solution module 216 may also be configured to consider previous acceptance/rejection of the historical solution by the current user for a similar issue faced by the current user in the past and enforce the solution or generate a warning message.

In one embodiment, if the set of historical solutions is not applicable to address the current issue, the data mining module 218 may be configured to extract one or more new solutions, associated with the current issue, from one or more secondary data sources 108. It must be noted that the data mining module 218 may extract the one or more new solutions only when the historical solution is not applicable to address the current issue. The data mining module 218 is configured to index the one or more new solutions extracted from the one or more secondary data sources 108. In one embodiment, the secondary data sources 108 may comprise URIs, source control, bugs and test database, and support system. Furthermore, the data mining module 218 may be configured to browse internet for identifying the one or more new solutions applicable to the current issue. In another embodiment, apart from the profile database, a bugs and testing database may be configured to store solutions associated with the issues faced by users of the Integrated Development Environment (IDE). The functioning of the data mining module 218 is further explained with respect to FIG. 4.

Once the one or more new solutions, associated with the current issue, are extracted and indexed the solution suggesting module 220 is configured to suggest the one or more new solutions to the current user. Furthermore, the solution suggesting module 220 is configured to update the set of historical solutions to include the one or more new solutions.

In one embodiment, the solution suggesting module 220 may enable the current user to accept or reject the one or more new suggestions. The action of acceptance or rejection of the current user may be referred as user behavior. The solution suggesting module 220 may validate the user behavior and update the user profile data. The user behavior may be updated to the user profile data maintained at the repository 224. The solution suggesting module 220 may not allow the current user to reject the one or more new solutions, if the current user has rejected the one or more solutions previously whereby the non-acceptance of the suggested solution resulted in generation of new issues in the software under development. Furthermore, the solution suggesting module 220 is configured to update the set of historical solutions to include the one or more new solutions determined by the data mining module 218. Further, the process for guiding the user of the Integrated Development Environment (IDE) by the system 102 is further elaborated with respect to the block diagram of FIG. 3.

Figure 3:
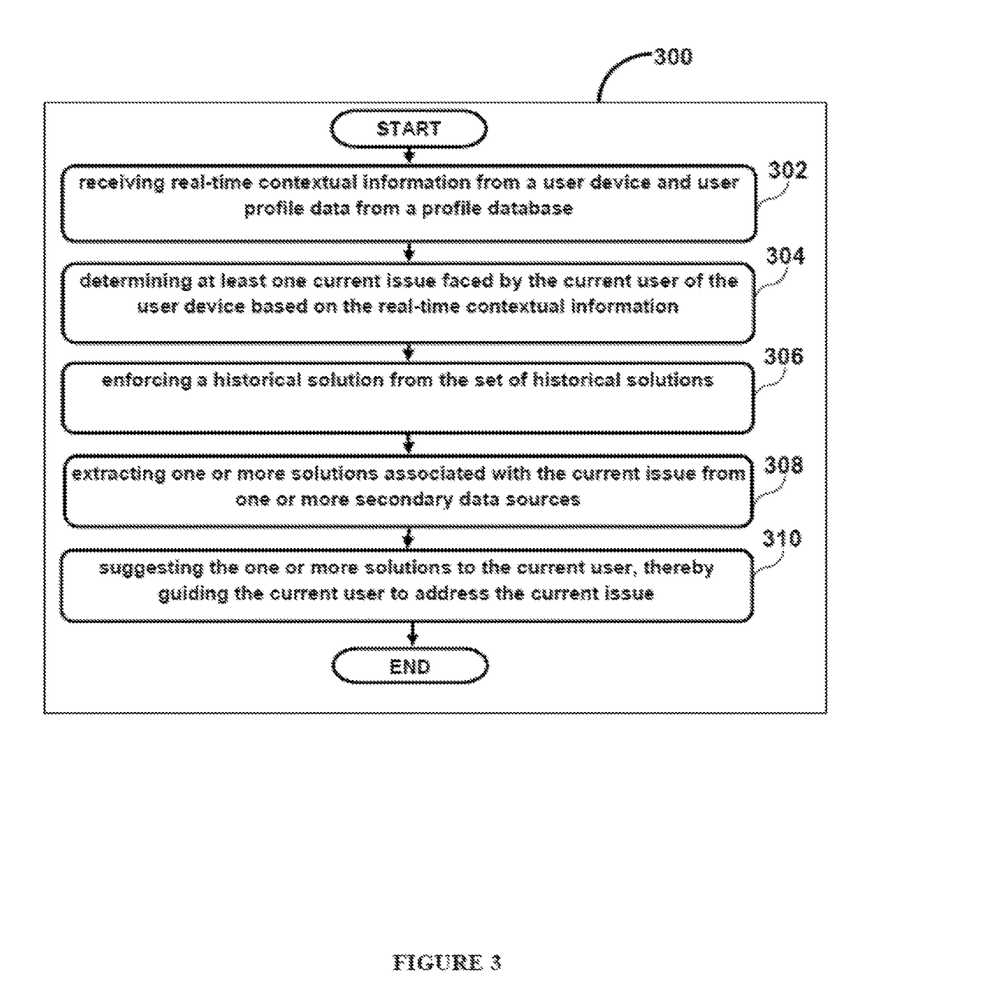
FIG. 3 illustrates a flowchart to enable the system for guiding the user of the Integrated Development Environment (IDE), in accordance with an embodiment of the present subject matter.

Referring now to FIG. 3, a method 300 for guiding a user of an Integrated Development Environment (IDE), is disclosed in accordance with an embodiment of the present subject matter. The method 300 may be described in the general context of computer executable instructions. Generally, computer executable instructions can include routines, programs, objects, components, data structures, procedures, modules, functions, and the like, that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented in the above described system 102.

At block 302, the data capturing module 212 is configured to receive a real-time contextual information from a user device 104 of a current user. In one embodiment, the real-time contextual information may be captured by a local data processing unit enabled over the user device 104. The real-time contextual information may be associated with an Integrated Development Environment (IDE) enabled over the user device 104. The Integrated Development Environment (IDE) may be used by the current user for development or testing of a software product. The real-time contextual information may further comprise additional information corresponding to software application running on the user device. In one embodiment, the real-time contextual information may be determined, by the local data processing unit, based on at least one of a software development language, type of Integrated Development Environment (IDE), software defects and user profile data. The real-time contextual information may also include information regarding processes running on the user device and keystrokes of the current user. In one embodiment, the real-time contextual information may be captured at the user device using text mining and machine learning algorithms enabled by the local data processing unit.

Furthermore, at block 302, the data capturing module 212 may receive a user profile data associated with the current user, from a profile database maintained in the repository 224. The user profile data may comprise a set of historical solutions associated with the current user of the user device 104. In one embodiment, the current user of the user device 104 may be a software developer or a software tester. Furthermore, the set of historical solution may comprise historical learning of the current user based on a set of historical issues faced by the current user in the Integrated Development Environment (IDE), comments received by the current user, and the like. In one embodiment, the user profile data may be replicated across different user devices 104 connected to the system 102.

At block 304, the issue identification module 214 is configured to determine at least one current issue, faced by the current user, based on the real-time contextual information. In one embodiment, the current issue may be software bug, code error, syntax error and the like. The issue identification module 214 may be configured to capture the current issue faced by the current user based on a pop-up error message displayed on the user interface of the user device 104. In another embodiment, the issue identification module 214 may be configured to analyse error log data, generated by the IDE, for determining the current issues faced by the current user.

In one embodiment, the current user may face multiple issues at a particular point of time, in the Integrated Development Environment (IDE), through the software product development lifecycle. In this case, the issue identification module 214 is configured to scan and prioritize each issue among the multiple issues faced by the current user. The issue identification module 214 is configured to assign a weighted score to each issue. Further, the issue identification module 214 is configured to sequentially address the issues based on the weighted score.

At block 306, once the current issue is identified, the solution enforcement module 216 is configured determine if a solution for the current issue is already present in a set of historical solutions. The presence of the solution for the current issue in the set of historical solutions indicate that the current user has already faced the a similar or same issue in the past and has not accepted/adopted to the solution provided to him in the past. If the solution is already present in the set of historical solutions, the enforcing historical solution module 216 is configured to enforce the historical solution from the set of historical solutions applicable to the current issue without the consent of the current user. In one embodiment, instead of enforcing the solution, a warning message may also be given to the current user in order to follow/get used to the solutions already suggested to the current user. The enforcing historical solution module 216 may also be configured to consider previous acceptance/rejection of the historical solution by the current user for a similar issue faced by the current user in the past and enforce the solution or generate a warning message.

At block 308, if the set of historical solutions is not applicable to address the current issue, the data mining module 218 may be configured to extract one or more new solutions, associated with the current issue, from one or more secondary data sources 108. It must be noted that the data mining module 218 may extract the one or more new solutions only when the historical solution is not applicable to address the current issue. The data mining module 218 is configured to index the one or more new solutions extracted from the one or more secondary data sources 108. In one embodiment, the secondary data sources 108 may comprise URIs, source control, bugs and test database, and support system. Furthermore, the data mining module 218 may be configured to browse internet for identifying the one or more new solutions applicable to the current issue. In another embodiment, apart from the profile database, a bugs and testing database may be configured to store solutions associated with the issues faced by users of the Integrated Development Environment (IDE).

Further, at block 310, the solution suggesting module 220 may enable the current user to accept or reject the one or more new suggestions. The action of acceptance or rejection of the current user may be referred as user behavior. The solution suggesting module 220 may validate the user behavior and update the user profile data. The user behavior may be updated to the user profile data maintained at the repository 224. The solution suggesting module 220 may not allow the current user to reject the one or more new solutions, if the current user has rejected the one or more solutions previously whereby the non-acceptance of the suggested solution resulted in generation of new issues in the software under development. Furthermore, the solution suggesting module 220 is configured to update the set of historical solutions to include the one or more new solutions determined by the data mining module 218.

At block 310, once the one or more new solutions, associated with the current issue, are extracted and indexed the solution suggesting module 220 is configured to suggest the one or more new solutions to the current user. Furthermore, the solution suggesting module 220 is configured to update the set of historical solutions to include the one or more new solutions.

Figure 4:
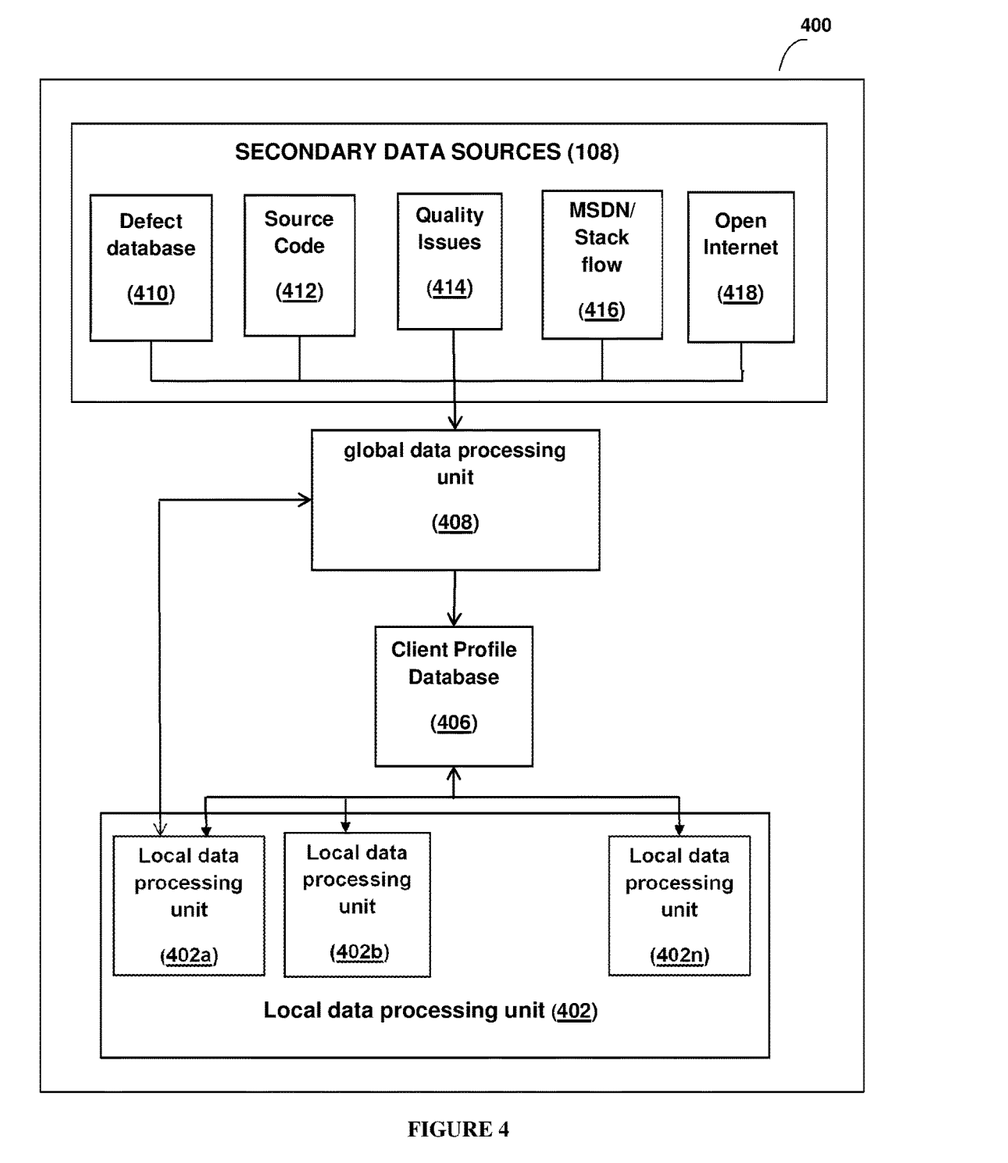
FIG. 4 illustrates a block diagram for guiding the user of the Integrated Development Environment (IDE).

Referring now to FIG. 4, a block diagram of a system 102 for guiding a user of an Integrated Development Environment (IDE) is disclosed in accordance with an embodiment of the present subject matter. The system 102 for guiding the current user of the Integrated Development Environment (IDE) may comprise one or more local data processing units 402a, 402b . . . , 402n (collectively referred to as local data processing units 402 hereinafter) each residing on a separate user device 104, a global data processing unit 408 residing on the system 102, client profile database 406, and secondary data sources 108.

The global data processing unit 408 is configured to receive the real-time contextual information from the local data processing unit 402. The local data processing unit 402 may reside on the user device 104 of the current user. The local data processing unit 402 may be configured to capture the real-time contextual information associated with the Integrated Development Environment (IDE). The local data processing unit 402 is configured to use text mining and machine learning algorithm to determine the real-time contextual information.

Furthermore, the global data processing unit 408 is configured to receive a user profile data of the current user from the client profile database 406 stored at the repository 224. The user profile data may comprise a set of historical solutions associated with the current user of the user device 104. In one embodiment, the current user of the user device 104 may be a software developer or a software tester. Furthermore, the set of historical solution may comprise historical learning of the current user based on a set of historical issues faced by the current user in the Integrated Development Environment (IDE), comments received by the current user, and the like. In one embodiment, the user profile data may be replicated across different local data processing unit 402 connected to the system 102.

In the next step, the global data processing unit 408 may be configured to determine at least one current issue, faced by the current user, based on the real-time contextual information. In one embodiment, the current issue may be software bug, code error, syntax error and the like. The global data processing unit 408 may be configured capture the current issue faced by the current user based on a pop-up error message displayed on the user interface. In another embodiment, global data processing unit 408 may be configured to analyse error log data generated by the IDE for determining the current issues faced by the current user.

In one embodiment, the current user may face multiple issues, in the Integrated Development Environment (IDE), throughout the software product development lifecycle. In this case, the global data processing unit 408 is configured to scan and prioritize each issue among the multiple issues faced by the current user. The global data processing unit 408 may be configured to maintain a document that comprises description of each issue, faced by the current user. Each document may be referred as an artifact. Further, the global data processing unit 408 may be configured to assign a weighted score (WS) to each issue, among the multiple issues. An issue with highest weighted score may have highest priority and the global data processing unit 408 may first address the issue with highest weighted score. The weighted score may be calculated based on word frequency of one or more labels (Ex. Description, Impact and Recommendation) associated with an artifact. For a single label, the word frequency may be calculated using equation (i) and equation (ii) as follows:

LC—Unique occurrence of all words in a label for a single artifact
TLC—Unique occurrence of all words in a label in all artifacts
TLF—Total occurrence of all the words in a label in all artifacts $$LWS=LC*(TLC/TLF) \qquad (i)$$

The weighted score for a single artifact is—

$$WS=\Sigma_{i=1}^{i=N}LWSi \qquad (ii)$$

where N is the total number of scanned artifacts.

In one embodiment, the global data processing unit 408 may be configured to determine if a solution for the current issue, with highest weighted score, is already present in a set of historical solutions. If the solution is already present in the set of historical solutions, the global data processing unit 408 is configured to enforce the historical solution from the set of historical solutions applicable to the current issue without the consent of the current user. The global data processing unit 408 may also be configured to consider previous acceptance/rejection of the historical solution by the current user for a similar issue faced by the current user in the past.

In the next step, the global data processing unit 408 may be configured to extract one or more new solutions, associated with the current issue, from one or more secondary data sources 108. The global data processing unit 408 may extract the one or more new solutions only when the historical solution is not applicable to address the current issue. The global data processing unit 408 may be configured to index the one or more new solutions extracted from the one or more secondary data sources 108. In one embodiment, the secondary data sources 108 may comprise defect database 410, source code 412, quality issues 414, MSDN/stack flow 416 and open internet 418. In another embodiment, defect database 410 may be configured to store solutions associated with the issues faced by users of the Integrated Development Environment (IDE). Further, the source code 412 may be configured to store source code samples associated with the Integrated Development Environment (IDE). Furthermore, the global data processing unit 408 may be configured to browse the open internet 418 for identifying the one or more new solutions applicable to the current issue.

Once the one or more new solutions associated with the current issue are extracted and indexed the global data processing unit 408 may be configured to suggest the one or more new solutions to the current user. Furthermore, the global data processing unit 408 is configured to update the set of historical solutions to include the one or more new solutions.

In one embodiment, the global data processing unit 408 may enable the current user to accept or reject the one or more new suggestions. The action of acceptance or rejection of the current user may be referred as user behavior. The global data processing unit 408 may validate the user behavior and update the user profile data. The user behavior may be stored at the user profile maintained at the repository 224. The global data processing unit 408 may not allow the current user to reject the one or more new solutions, if the current user has rejected the one or more solutions previously whereby the non-acceptance of the suggested solution resulted in generation of new issues in the software under development. Furthermore, the server module 408 is configured to update the set of historical solutions to include the one or more new solutions.

Figure 5:
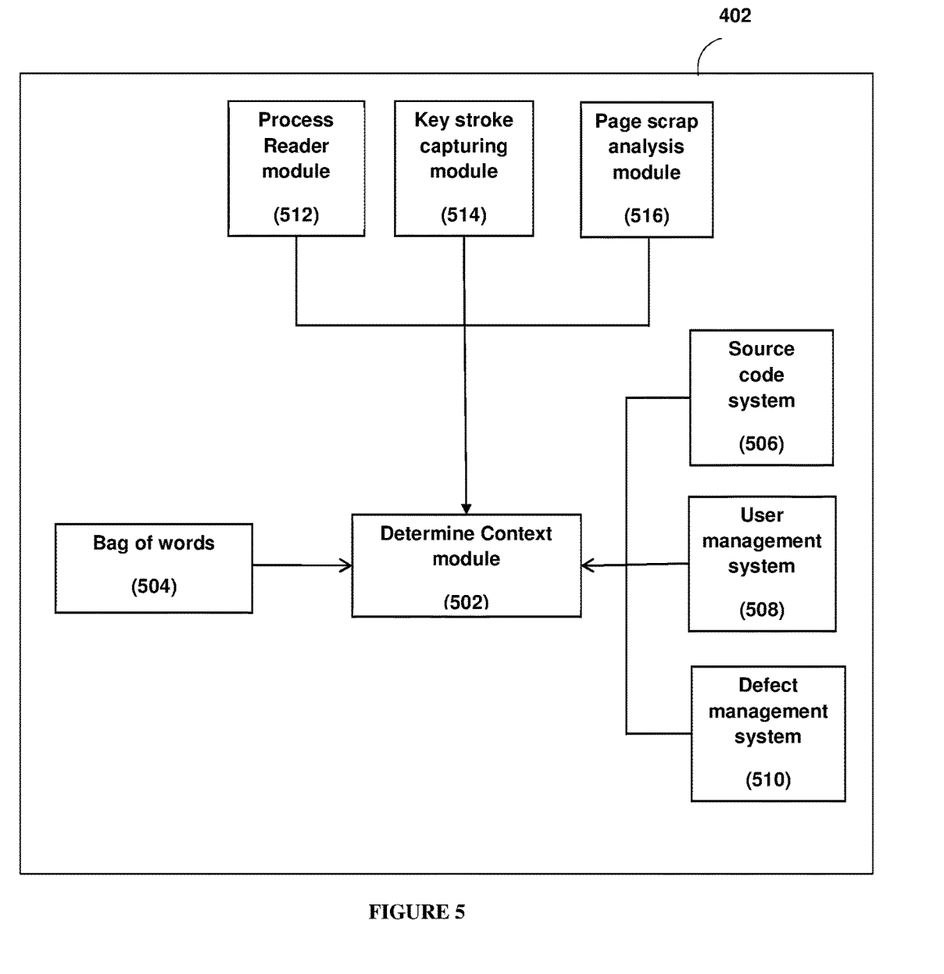
FIG. 5 illustrates a block diagram for determining real-time contextual information of the user of the Integrated Development Environment (IDE).

Referring now to FIG. 5, a block diagram of the local data processing unit 402 configured for determining real-time contextual information is disclosed in accordance with an embodiment of the present subject matter. The local data processing unit 402 comprises a determine context module 502 that is configured to fetch data from different modules to determine the real-time contextual information of the current user.

The bag of words 504 is configured to store information regarding software language, Integrated Development Environments (IDE) and the like. The bag of words 504 may use text mining and machine learning algorithm for fetching this information. The Integrated Development Environment (IDE) may be at least one of Eclipse, Visual Studio, Bugzilla, Pangea etc.

Further, the process reader module 512 is configured to determine a list of other processes that are running on the user device 104. The process reader module 512 uses machine learning algorithm to determine the active processes. The other processes may correspond to one or more documents that are open on the user device 104, any web page open on the user device 104, information regarding system updates and the like.

Furthermore, the keystroke capturing module 514 is configured to collect the information regarding what the current user of the user device 104 is typing. The keystroke capturing module 514 uses text mining algorithm to collect typing information. In one embodiment, when the current user is typing one or more words on a page of the Integrated Development Environment (IDE), the keystroke capturing module 514 is configured to capture the one or more words and update the number showing occurrence of the one or more words.

Further, the page scrap analysis module 516 is configured to take a scrap of a page, of the Integrated Development Environment (IDE), on which the current user is working. After taking the scrap of the page, the page scrap analysis module 516 is configured to use text mining algorithm to determine the language that the current user is using.

In one embodiment, the source code system 506, is a repository that stores a source code on which the current user of the user device 104 has previously worked.

The current user management system 508, is a database storing data regarding one or more users of the user device 104. The current user management system 508 may use text mining and machine learning algorithms to fetch the user specific data and store the user specific data.

The defect management system 510, is a repository of all the defects faced by one or more users, working in the same Integrated Development Environment (IDE). The defects may comprise software bugs, code errors, syntax errors and the like.

The determine context module 502 is configured to determine the real-time contextual information by fetching data from the bag of words 504, the process reader module 512, the keystroke capturing module 514, the page scrap analysis module 516, source code system 506, the user management system 508, the defect management system 510. Further, the determine context module 502 is configured to send the real-time contextual information to the global data processing unit 408 and proceed further.

Although implementations for systems and methods for guiding a user of an Integrated Development Environment (IDE) have been described, it is to be understood that the appended claims are not necessarily limited to the specific features or methods described. Rather, the specific features and methods are disclosed as examples of implementations for determining optimized test suite for guiding a user of an Integrated Development Environment (IDE).

The invention claimed is:

1. A system for guiding a user of an Integrated Development Environment (IDE), the system comprising:
   a memory; and
   a processor coupled to the memory, wherein the processor is configured to execute programmed instructions stored in the memory to:
      receive
         real-time contextual information from a user device, wherein the real-time contextual information is associated with an Integrated Development Environment (IDE) enabled over the user device, wherein the real-time contextual information is determined based on at least one of a software development language, type of Integrated Development Environment (IDE), software defects and user profile data, and
         the user profile data, from a profile database, associated with a current user of the user device, wherein the user profile data comprises a set of historical solutions associated with the current user;
      determine a current issue faced by the current user of the user device based on the real-time contextual information, and whether the current issue has been previously faced by the current user;
      prioritize the current issue to be addressed, when multiple current issues are simultaneously faced by the current user, wherein the current issue, of the multiple issues, is prioritize based on a weighted score, wherein the weighted score is computed based on a formulation comprising $WS=\Sigma_{i=1}^{i=N} LWSi$, wherein $LWS=LC*(TLC/TLF)$, and wherein 'LC' indicates Unique occurrence of all words in a label for a single artifact, 'TLC' indicates Unique occurrence of all words in a label in all artifacts, 'TLF' indicates Total occurrence of all the words in a label in all artifacts, and wherein an artifact is a document comprising description of each issue faced by the current user;
      enforce a historical solution when the historical solution is present in the set of historical solutions, wherein the presence of the historical solution in the set of historical solutions ensures that the current issue has been previously faced by the current user;
      extract one or more new solutions associated with the current issue from one or more secondary data sources, when the current issue is not associated with a set of historical solutions; and
      suggest the one or more new solutions to the current user, when the set of historical solutions is not applicable to the current issue, thereby guiding the current user of the Integrated Development Environment (IDE) to address the current issue.

2. The system of claim 1, wherein the current user is a software developer or a software tester.

3. The system of claim 1, wherein the real-time contextual information is captured by a client side data processing unit enabled over the user device using text mining and machine learning algorithm.

4. The system of claim 1, further configured to enable a user profile interface to replicate the user profile across different user devices.

5. The system of claim 1, wherein the real-time contextual information is determined based on at least one of software development language, type of Integrated Development Environment (IDE), software defects and user profile data.

6. The system of claim 1, the secondary data sources comprise URIs, source control, bugs and test database, and support system.

7. The system of claim 1, further configured to update the set of historical solutions to include the one or more new solutions.

8. A method for guiding a user of an Integrated Development Environment (IDE), the method comprising:
   receiving, by a processor,
      real-time contextual information from a user device, wherein the real-time contextual information is associated with an Integrated Development Environment (IDE) enabled over the user device, wherein the real-time contextual information is determined based on at least one of a software development language, type of Integrated Development Environment (IDE), software defects and user profile data, and
      the user profile data, from a profile database, associated with a current user of the user device, wherein the user profile data comprises a set of historical solutions associated with the current user;
   determining, by the processor, a current issue faced by the current user of the user device based on the real-time contextual information, and whether the current issue has been previously faced by the current user;
   prioritizing the current issue to be addressed, when multiple current issues are simultaneously faced by the current user, wherein the current issue, of the multiple issues, is prioritize based on a weighted score, wherein the weighted score is computed based on a formulation comprising $WS=\Sigma_{i=1}^{i=N} LWSi$, wherein $LWS=LC*(TLC/TLF)$, and wherein 'LC' indicates Unique occurrence of all words in a label for a single artifact, 'TLC' indicates Unique occurrence of all words in a label in all artifacts, 'TLF' indicates Total occurrence of all the words in a label in all artifacts, and wherein an artifact is a document comprising description of each issue faced by the current user;
   enforcing, by the processor, a historical solution when the historical solution is present in the set of historical solutions, wherein the presence of the historical solution in the set of historical solutions ensures that the current issue has been previously faced by the current user;
   extracting, by the processor, one or more new solutions associated with the current issue from one or more secondary data sources, when the current issue is not associated with a set of historical issues; and
   suggesting, by the processor, the one or more new solutions to the current user, when the current issue is not associated with the set of historical issues, thereby guiding the current user of the Integrated Development Environment (IDE) to address the current issue.

9. The method of claim 8, wherein the current user is a software developer or a software tester.

10. The method of claim 8, wherein the real-time contextual information is captured by a client side data processing unit enabled over the user device using text mining and machine learning algorithm.

11. The method of claim 8, further configured to enable a user profile interface to replicate the user profile across different user devices.

12. The method of claim 8, wherein the real-time contextual information is determined based on at least one of software development language, type of Integrated Development Environment (IDE), software defects and user profile data.

13. The method of claim 8, the secondary data sources comprise URIs, source control, bugs and test database, and support system.

14. The method of claim 8, further configured to update the set of historical solutions to include the one or more new solutions.

15. A computer program product having embodied thereon a computer program for guiding a user of an Integrated Development Environment (IDE), the computer program product comprising:
- a program code for receiving
  - real-time contextual information from a user device, wherein the real-time contextual information is associated with an Integrated Development Environment (IDE) enabled over the user device, wherein the real-time contextual information is determined based on at least one of a software development language, type of Integrated Development Environment (IDE), software defects and user profile data, and
  - the user profile data, from a profile database, associated with a current user of the user device, wherein the user profile data comprises a set of historical solutions associated with the current user;
- a program code for determining a current issue faced by the current user of the user device based on the real-time contextual information, and whether the current issue has been previously faced by the current user;
- a program code for prioritizing the current issue to be addressed, when multiple current issues are simultaneously faced by the current user, wherein the current issue, of the multiple issues, is prioritize based on a weighted score, wherein the weighted score is computed based on a formulation comprising $WS=\Sigma_{i=1}^{i=N} LWSi$, wherein $LWS=LC*(TLC/TLF)$, and wherein 'LC' indicates Unique occurrence of all words in a label for a single artifact, 'TLC' indicates Unique occurrence of all words in a label in all artifacts, 'TLF' indicates Total occurrence of all the words in a label in all artifacts, and wherein an artifact is a document comprising description of each issue faced by the current user;
- a program code for enforcing a historical solution when the historical solution is present in the set of historical solutions, wherein the presence of the historical solution in the set of historical solutions ensures that the current issue has been previously faced by the current user;
- a program code for extracting one or more new solutions associated with the current issue from one or more secondary data sources, when the current issue is not associated with a set of historical issues; and
- a program code for suggesting the one or more new solutions to the current user, when the current issue is not associated with the set of historical issues, thereby guiding the current user of the Integrated Development Environment (IDE) to address the current issue.

* * * * *